Jan. 31, 1956  P. C. JURS ET AL  2,732,856
VACUUM VENT VALVE
Filed April 15, 1953  3 Sheets-Sheet 1

INVENTORS
Peter C. Jurs
Robert W. Blake
BY
ATTORNEYS

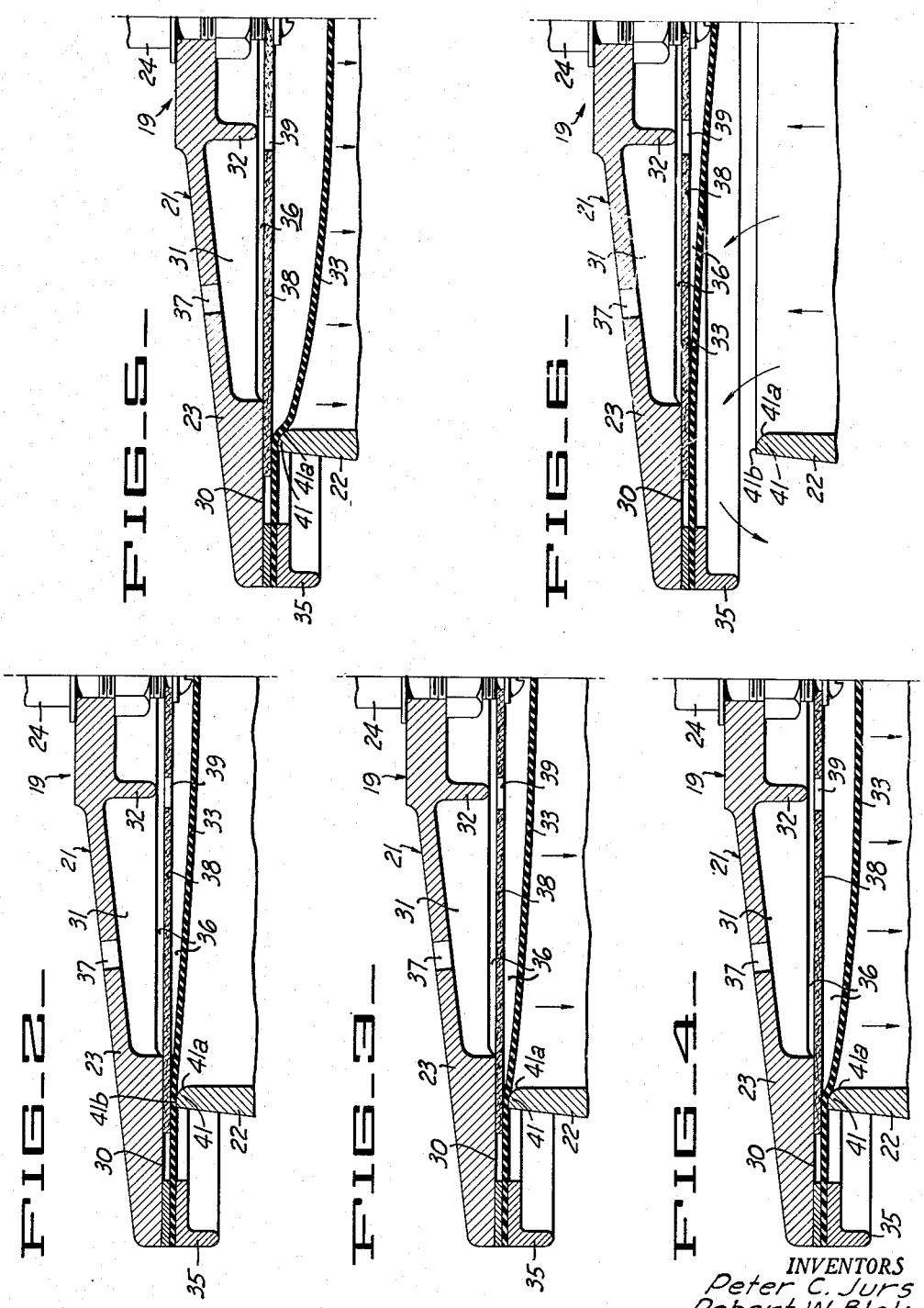

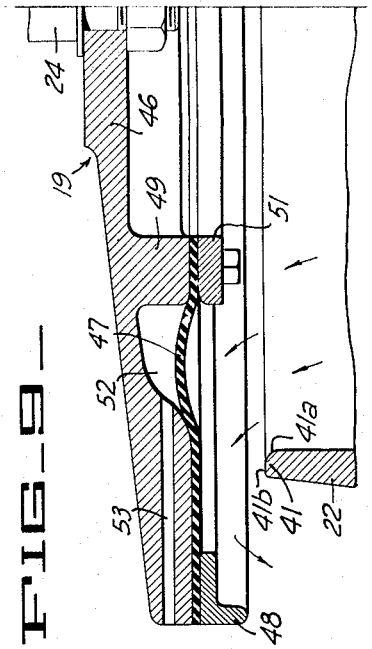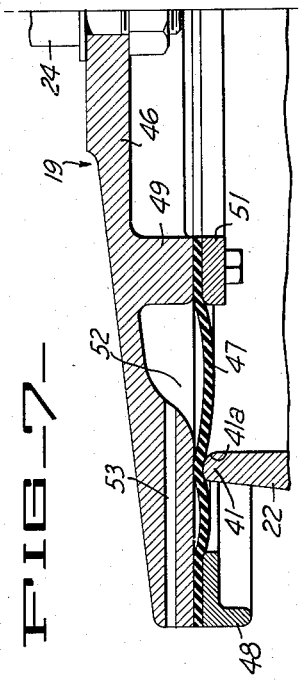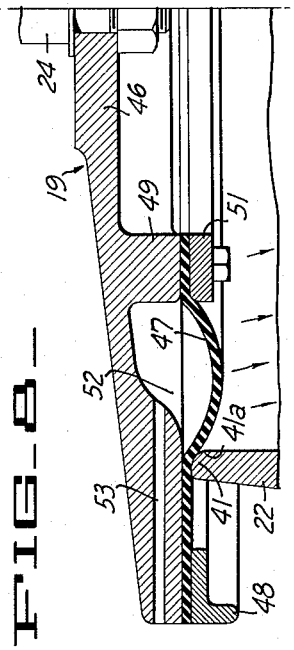

United States Patent Office 2,732,856
Patented Jan. 31, 1956

2,732,856
VACUUM VENT VALVE

Peter C. Jurs, Oakland, Calif., and Robert W. Blake, Chicago, Ill., assignors, by mesne assignments, to Shand and Jurs Company, Berkeley, Calif., a corporation of California Application April 15, 1953, Serial No. 348,894

7 Claims. (Cl. 137—469)

This invention relates generally to vent valves such as are suitable for protecting tanks or other systems against abnormal pressure or vacuum conditions.

In many industrial applications as for example, the petroleum industry, it is necessary to protect storage tanks against abnormal conditions of pressure or vacuum by the use of suitable relief or vent valves. To protect against excessive pressure above atmospheric, a pressure operated vent valve may be provided which is set to open at pressures of the order of say 2 or 3 inches (water column). Another vent valve is provided to protect against excessive vacuum conditions. In many instances vacuum conditions are exceptional, and the tank pressure will generally range from atmospheric to a pressure value somewhat below the pressure for which the pressure operated vent valve is set to open. For this normal range it is highly desirable to maintain leakage at a minimum.

In copending application Serial No. 238,839, filed July 27, 1951, there is disclosed a vent valve adapted to open under excessive tank pressure, and which is capable of maintaining an effective fluid tight seal for normal tank pressures up to the pressure for which the valve is set to open. The vent valve disclosed in said application Serial No. 238,839, can also be applied to protect against excessive vacuum conditions. Particularly it will provide an effective seal for vacuum conditions ranging from atmospheric to the subatmospheric pressure for which the valve is set to open. However, for pressures ranging slightly above atmospheric, a vacuum vent valve made as disclosed in said application Serial No. 238,839 may permit some undesirable leakage.

The present invention provides a vent construction which can be used effectively to protect against excessive vacuum conditions, but which is likewise capable of maintaining a tight seal for conditions of tank pressure ranging above atmospheric. It is therefore an object of the invention to provide a valve having such characteristics.

Another object of the invention is to provide a vacuum vent valve which is relatively simple in construction, and which can be readily incorporated in various types of breather valves for tanks.

Another object of the invention is to provide a vent valve of the above character which will not fail to operate because of formation of ice between the sealing surfaces.

Additional objects and features of the invention will appear from the following description in which the preferred embodiments of the invention have been set forth in detail in conjunction with the accompanying drawings.

Referring to the drawing:

Figure 2 is an enlarged detail in section illustrating the vent valve of Figure 1.

Figure 3 is an enlarged detail showing the parts in closed position and assuming that the tank pressure is slightly above atmospheric.

Figure 4 is a detail like Figure 3 but showing the position of the diaphragm when the tank pressure is slightly greater than for Figure 3.

Figure 5 is a detail like Figure 3 showing the position of the diaphragm when the tank pressure is greater than for Figure 4.

Figure 6 is a detail like Figure 3 but showing the vent valve in open position, to relieve excessive vacuum.

Figure 7 is a detail like Figure 2 but showing another embodiment.

Figures 8 and 9 are details like Figure 2, but showing operating positions corresponding to Figures 5 and 6.

Figure 1:
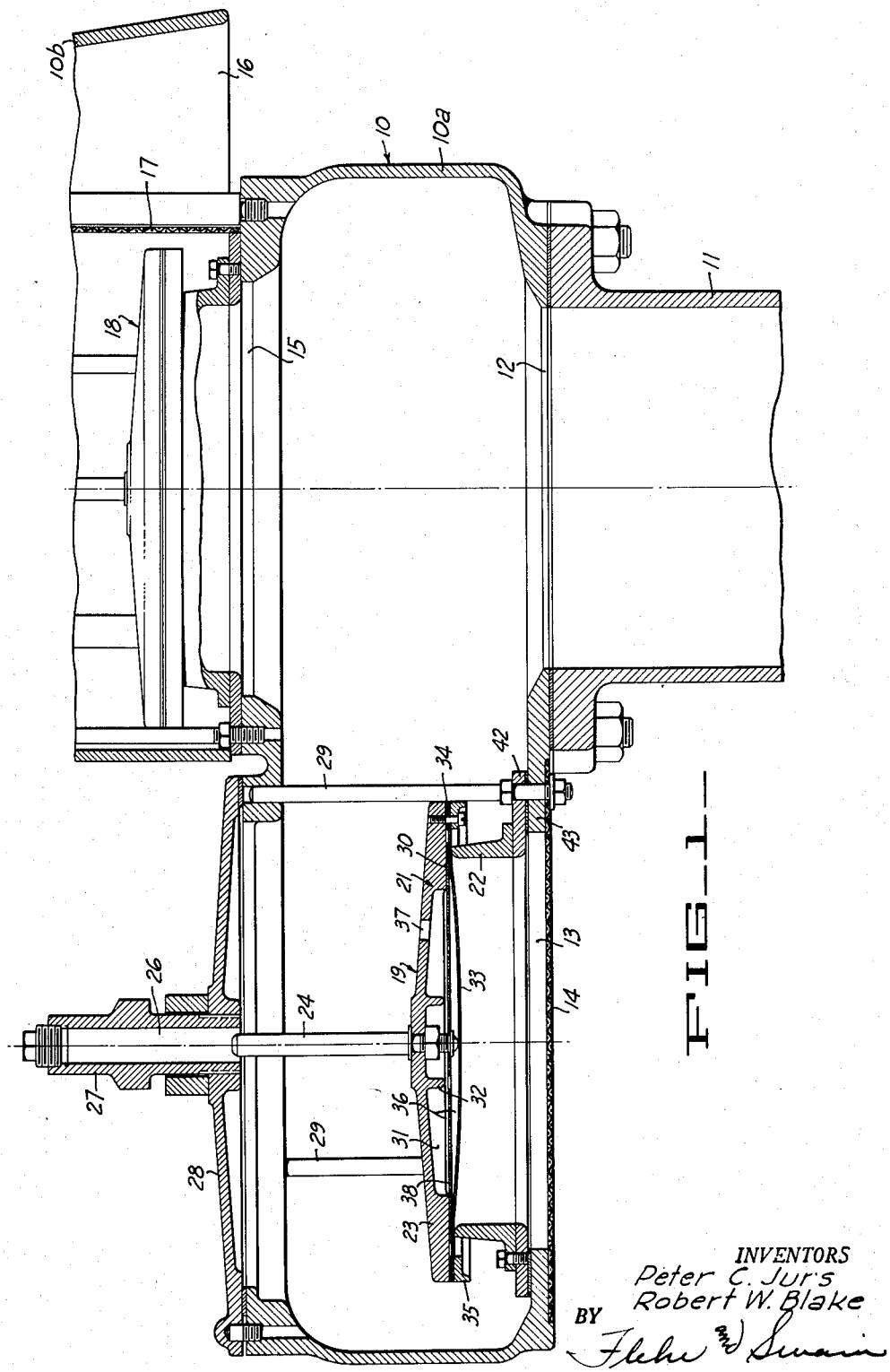
Figure 1 is a side elevational view, partly in section, illustrating a breather valve incorporating the present invention.

The apparatus illustrated in Figures 1 and 2 of the drawing consists of a housing 10 adapted to be connected to an associated pipe 11. In a typical installation this pipe connects with the vapor space of a storage tank containing gasoline or like volatile liquids. The main section 10a of the housing has an opening or passage 12 in communication with the pipe 11, and an opening 13 that is covered by a screen 14, and which communicates with the atmosphere. Also it has an opening or passage 15 which communicates with the upper housing section 10b. This upper housing section is in free communication with the atmosphere through the opening 16 which is provided with a screen 17. Flow through the opening 16 is controlled by a suitable pressure vent or relief valve 18, such as a valve of the type disclosed and claimed in the aforesaid copending application Serial No. 238,839. Flow through the opening 13 is controlled by the vacuum vent valve means 19, which preferably is constructed as illustrated in Figure 2.

The vacuum vent valve means 19 consists of a pallet assembly 21 which cooperates with the stationary seat ring 22. The pallet assembly consists of body 23 made of a suitable rigid material, such as a casting of aluminum or other suitable metal. A rod or guide stem 24 is attached to the central portion of the body, and is adapted to be loosely accommodated within the opening formed in the fitting 27. This fitting is suitably carried by the cover 28 of the housing. Additional vertical guide rods 29 serve to generally retain the pallet assembly against lateral displacement.

The lower side of the pallet body 23 is formed to provide the flat annular face 30. Inwardly of the face 30, the body can be provided with suitable stiffening ribs 31 and 32.

A flexible diaphragm 33 formed of suitable resilient material extends entirely across the lower side of the pallet body. The peripheral edge of the diaphragm is clamped in sealed relation with the peripheral edge of the pallet body, by suitable means such as a clamping ring 35. The diaphragm can be formed of suitable material consistent with the service to which the valve is to be applied. For example, it can be formed of synthetic rubber such as Hycar or neoprene. The space 36 between the pallet body and the main part of the diaphragm is in free communication with the interior of the body through the opening 37. Thus tank pressure is applied to the upper side of the diaphragm.

In some instances it may be desirable to provide a cushioning member 38 interposed between the pallet body and the diaphragm. This member can be formed of suitable material such as a sheet of plastic impregnated cork. It can be retained in place by suitable means, as for example by attaching its center to the lower end of the stem 24, as illustrated. Its outer circular edge can terminate intermediate the seat ring 22, and the clamping ring 35. Pressure equalization between the spaces above and below the member 38 can be assured by providing one or more openings 39 through the same.

The upper end face of the seat ring 22 is formed to provide the valve working surface 41. This surface includes the inner corner or edge portion 41a, and the upwardly faced surface portion 41b. The edge portion 41a can be more or less curved or beveled, depending upon the thickness and character of the diaphragm.

The seat ring is suitably mounted within the body. For example, it can be secured to a mounting annulus 42, which in turn is secured to the housing flange 43.

Operation of our vacuum vent valve can best be understood by reference to Figures 2 to 6 inclusive. Assuming that the tank pressure is atmospheric, then no pressure differential is applied to the diaphragm, and the parts are positioned substantially as illustrated in Figure 2. Note that the main portion of the diaphragm inwardly of the seat 22 may sag downwardly a small amount because of its weight. The weight of the pallet assembly is carried by that part of the diaphragm which is interposed between the valve working surface and the outer margin of the cushioning member 38. Assuming that the tank pressure increases to a value slightly above atmospheric, a differential pressure is applied directly to the diaphragm 33, with the result that the diaphragm is deflected downwardly in the manner illustrated in Figure 3. Note particularly that the diaphragm is flexed and pressed over the edge portion 41a of the valve working surface, and that this pressure contact is independent of any downward pressure applied to the pallet assembly as a whole. The force components of this pressure contact (on edge portion 41a) are both downwardly and outwardly relative to the vertical axis of the seat ring. Thus under such conditions a good fluid tight seal is established, primarily because of the independent pressing of the diaphragm against the edge portion 41a. Thus under such conditions, a good fluid tight seal is maintained, irrespective of any slight lack of uniformity in downward pressure applied by the pallet assembly. As the tank pressure is further increased the diaphragm is further deflected in the manner illustrated in Figures 4 and 5. Under such conditions there is a further pressing down of the diaphragm over the edge portion 41a, thus furthering the sealing effect described with reference to Figure 3. If an abnormal vacuum condition is created the differential pressure applied to the diaphragm is reversed, and after the diaphragm has been pressed upwardly against the pallet, the pallet lifts to clear the seat and permit venting as illustrated in Figure 6. While the diaphragm is moving upwardly, immediately prior to the movement of the complete pallet assembly, it is stripped or peeled away from the edge portion 41a. This stripping or peeling away aids in obtaining positive and reliable opening of the valve under excessive vacuum conditions. For example, if temperature conditions are such as to cause icing, the peeling away action separates the valve surfaces without the use of excessive force, even though a film of ice may have formed between them.

In the embodiment of Figures 7 to 9 inclusive the diaphragm is annular and has both its outer and inner margins clamped to the pallet body. Also, the member 38 has been omitted. The pallet body 46 in this instance carries the flexible annular diaphragm 47. The outer margin of the diaphragm is attached to the pallet body by the clamping ring 48, and the inner margin is clamped to the annular body rib 49 by the clamping ring 51. The space 52 between the body of the pallet and the unsecured portion of the diaphragm is in communication with the space above the pallet, through one or more ducts 53.

Operation of the embodiment shown in Figure 7 is the same as described for Figures 1 to 6 inclusive. Figure 7 corresponds to Figure 2 and represents the valve closed and with the pressures equalized. Figure 8 corresponds to Figure 5 and shows the effect of pressure applied to the opposite side. Figure 9 corresponds to Figure 6 and shows the valve in open position.

It will be apparent from the foregoing that we have provided a vacuum vent valve which maintains an absolute fluid tight seal for conditions of positive tank pressure, and which will provide a reliable and positive opening action under conditions of excessive vacuum. Although the tank pressures may be relatively low, the diaphragm has effective and independent sealing with respect to the seat ring, because such seal is maintained primarily by downward deflection of the diaphragm.

We claim:

1. In a vacuum vent valve for protecting tanks, a body having a passage for connection with a tank and an opening to the atmosphere, a seat ring within the body, said passage and opening being in communication through said seat ring, the upper end face of the seat ring forming a valve working surface, a vertically movable pallet body adapted to rest upon the seat ring, a flexible diaphragm of resilient material secured to and extending across the lower face of the pallet body, the outer peripheral edge of the diaphragm being secured to the pallet body, the diaphragm being interposed between the lower side of the pallet body and the valve working surface to thereby seal upon the valve working surface, the space above the diaphragm being exposed to the pressure in the body passage whereby under conditions of positive pressure in the passage that portion of the diaphragm extending inwardly from the seat is deflected into tight sealing contact with the inner edge portion of the valve working surface and whereby upon conditions of negative pressure in the passage that portion of the diaphragm extending inwardly from the seat is deflected upwardly against the pallet body and the pallet body is lifted clear of the seat ring to vent the passage to the atmosphere.

2. A valve as in claim 1 in which the diaphragm extends entirely across the lower face of the pallet body and in which a cushioning member is disposed between the pallet body and the diaphragm.

3. A valve as in claim 1 in which the diaphragm extends entirely across the lower face of the pallet body.

4. A valve as in claim 1 in which the diaphragm is annular and has its inner peripheral edge secured to the pallet body on a region spaced radially from the seat ring.

5. In a vacuum vent valve for protecting tanks, a body having a passage for connection with a tank and having an opening to the atmosphere, a seat ring within the body, said passage and said opening being in communication through said seat ring, the upper face of the seat ring forming a valve working surface extending in a generally horizontal plane, a rigid vertically movable pallet adapted to be carried by the seat ring and extending across the same, an impervious flexible diaphragm of resilient material disposed on the lower face of said pallet, the peripheral edge of the diaphragm being attached to the pallet in an annular region spaced outwardly from the seat ring, the diaphragm being interposed between the lower face of the pallet body and said valve working surface to seal upon the latter, an annular portion of the diaphragm extending inwardly of said peripheral edge and being free of the pallet body to allow flexing of the annular portion in a general vertical direction in response to pressure differential applied to the same, there being a space overlying the diaphragm and between the diaphragm and the pallet, said space being in communication with said passage of the body, said pallet remaining seated on said seat ring when the pressure in said passage is greater than atmospheric, said diaphragm being deflected downwardly when the pressure in said passage is greater than atmospheric to press the same downwardly and outwardly into tight sealing engagement with said valve working surface, said diaphragm being deflected upwardly when the pressure in said passage is less than atmospheric, said diaphragm peeling away from said valve working surface and pressing against the pallet to lift the same clear of the seat ring to vent the passage in said body to the atmosphere, said pallet and diaphragm dropping into engagement with said seat ring when atmospheric pressure has been restored in said passage.

6. A valve as in claim 5 in which the diaphragm extends entirely across the lower face of the pallet body and in which a cushioning member is also disposed across the lower face of the pallet between the pallet and the diaphragm, said cushioning member having its center portion attached to said pallet and having its outer periphery extending beyond said seat ring but falling short of the outer periphery of said diaphragm.

7. A valve as in claim 5 in which the diaphragm is annular and has its inner peripheral edge secured to the pallet along a region spaced radially from the seat ring.

References Cited in the file of this patent

UNITED STATES PATENTS

| | | |
|---|---|---|
| 2,101,991 | Finley | Dec. 14, 1937 |
| 2,272,304 | Lohman | Feb. 10, 1942 |
| 2,393,427 | Sparrow | Jan. 22, 1946 |
| 2,557,536 | Drane | June 19, 1951 |
| 2,655,175 | Glidden | Oct. 13, 1953 |